US00RE41321E

(19) United States
(12) Reissued Patent
Okumoto et al.

(10) Patent Number: US RE41,321 E
(45) Date of Reissued Patent: May 11, 2010

(54) HAIR STYLING IRON

(75) Inventors: Masataka Okumoto, Osaka (JP); Satoshi Ogawa, Osaka (JP); Atsuo Niwa, Osaka (JP); Yasufumi Takeda, Osaka (JP); Kazuki Fujii, Osaka (JP); Katsumi Kaneyama, Osaka (JP)

(73) Assignee: Milbon Company Ltd, Osaka (JP)

(21) Appl. No.: 10/342,306

(22) Filed: Jan. 15, 2003

Related U.S. Patent Documents

Reissue of:
(64) Patent No.: 6,173,718
Issued: Jan. 16, 2001
Appl. No.: 09/327,382
Filed: Jun. 8, 1999

(30) Foreign Application Priority Data

Jun. 29, 1998 (JP) ..... 98/182800
Feb. 15, 1999 (JP) ..... 99/036564

(51) Int. Cl.
*A45D 1/00* (2006.01)
*A45D 2/40* (2006.01)
*A45D 1/04* (2006.01)

(52) U.S. Cl. ..... 132/224; 132/225; 132/229; 219/222

(58) Field of Classification Search ..... 132/224, 132/225, 229, 232, 234; 219/222, 225; 16/431, 16/436
See application file for complete search history.

(56) References Cited

U.S. PATENT DOCUMENTS 1,422,826 A * 7/1922 Brown ..... 219/225
1,449,632 A * 3/1923 Talbot ..... 132/225

(Continued)

FOREIGN PATENT DOCUMENTS

| | | | | |
|---|---|---|---|---|
| DE | 910197 A | * | 4/1954 | |
| DE | 910197 | * | 4/1954 | ..... 132/229 |
| DE | 2615267 A1 | * | 10/1977 | |
| DE | 2615267 | * | 10/1977 | ..... 132/232 |
| JP | 59-95006 A | | 5/1984 | |
| JP | 62-189007 A | | 8/1987 | |
| JP | 62-299207 A | | 12/1987 | |
| JP | 63-19104 A | | 1/1988 | |
| JP | 63-65806 A | | 3/1988 | |
| JP | 02-71401 U | | 5/1990 | |
| JP | 05-095813 A | | 4/1993 | |
| JP | 05309011 A | * | 11/1993 | |
| JP | 06-209815 A | | 8/1994 | |
| JP | 07-243703 A | | 9/1995 | |
| JP | 09191920 A | * | 7/1997 | |
| JP | 09-308517 A | | 12/1997 | |
| WO | WO 98/35578 | * | 8/1998 | |

OTHER PUBLICATIONS

JPO Office Action published May 20, 2008.

*Primary Examiner*—Robyn Doan
(74) *Attorney, Agent, or Firm*—Browdy and Neimark, PLLC

(57) ABSTRACT

A hair styling iron A is provided comprising: a body 1 which includes a grip portion 4, a plate portion 6 including a heater H and a plate 8, and a fulcrum portion 5; and a sandwiching member 2 which includes a lever portion 15 opposed to said grip portion 4, a plate portion 17 equipped with a heater H and a plate 18 and opposed to the plate portion 6 of the body 1, and a fulcrum portion 16 located between the lever portion 15 and the plate portion 17 and pivotally supported by the fulcrum portion 16 of the body 1. Between the rearward portions of the fulcrum portions of the body 1 and the sandwiching member 2 is interposed a spring 12 which biases the plate portions 6 and 17 normally in the direction away from each other. Each of the plate portions 6 and 17 is provided with ridges 14 along the perimeter, and has been subjected to a flocking treatment from its perimeter to the outer surface.

13 Claims, 11 Drawing Sheets

U.S. PATENT DOCUMENTS 1,762,792 A * 6/1930 Ostrowski ..... 132/232
2,103,676 A * 12/1937 Karasiewicz ..... 132/225
3,752,017 A * 8/1973 Lloyd et al. ..... 81/9.44
3,923,069 A * 12/1975 Leclabart ..... 132/234
4,367,397 A * 1/1983 Henderson ..... 219/234
4,581,519 A * 4/1986 Thaler et al. ..... 132/232
4,739,151 A * 4/1988 Smal ..... 132/225
4,870,250 A * 9/1989 Rizzuto et al. ..... 219/225
4,917,078 A * 4/1990 Zaborowski ..... 219/225
4,939,340 A * 7/1990 Brill ..... 132/229
5,223,694 A * 6/1993 Tsuji et al. ..... 132/224
5,351,580 A * 10/1994 Potesta et al. ..... 81/9.44
5,934,293 A * 8/1999 Kaizuka ..... 132/225

* cited by examiner

HAIR STYLING IRON

Matter enclosed in heavy brackets [ ] appears in the original patent but forms no part of this reissue specification; matter printed in italics indicates the additions made by reissue.

BACKGROUND OF THE INVENTION

1. Technical Background of the Invention

The present invention relates to a hair styling iron, and more specifically to a hair styling iron used for giving a press treatment in which the hair is exposed to heat and pressure.

2. Relating Prior Art

Up to now, for giving straight-perm treatment to the hair, the hair is applied with a first perming solution and then smoothed down with a comb on a plastic plate called a "panel" while stroking the hair with the back of the comb. Alternatively, the hair is smoothed down with a comb only, without the help of a panel. Either of these operations, generally called a "strainer operation", is aimed for providing uniform rearrangement of the cuticle up to the tip of the hair by smoothing down the hair, thereby giving the hair a glossy smooth surface. The use of a panel, however, causes substantial damage to the hair. On the contrary, the operation, when carried out using a comb only, fails to provide uniform rearrangement of the cuticle, thus suffering from uncertain finish.

OBJECT OF THE INVENTION

An objective of the present invention is to provide a device that allows to carry out strainer or the like operations on the hair which is gentler to the hair than the operation employing the aforementioned panel, and of greater certainty than the operation using a comb only. A further objective of the present invention is to provide a hair styling iron which can be handled with ease even on thick and/or long hair and enables application of sufficient pressures. A still further objective of the present invention is to provide a hair styling iron capable of providing simultaneous heating and pressing treatment and yet causing less sensation of heat even when touching the heated portion thereof. A still further objective of the present invention is to provide a hair styling iron that allows an easy operation even on a confined region of short hair such as over the nape (back) or around the ears and yet causes less sensation of heat when holding its heated portions with fingers, thereby making it possible to carry out a delicate operation with certainty.

SUMMARY OF THE INVENTION

The hair styling iron of the present invention is characterized in that it comprises (A) a first lever including a grip portion, a plate portion equipped with an electric heater, and a fulcrum portion, and (B) a second lever including another grip portion opposed to the grip portion of the first lever, a plate portion equipped with an electric heater and opposed to the plate portion of the first lever, and a fulcrum portion pivotally supported by the fulcrum portion of the first lever.

In such a type of hair styling iron, a spring is preferably interposed between the first and the second levers to render the plate portions biased in the direction away from each other. Also, it is preferable that the plate portion of the first lever and (or) the second lever has ridges along the perimeter thereof, and it is more preferable that the plate portion of the first lever and (or) the second lever has been subjected to a flocking treatment from the perimeter to the outer surface thereof. Each of the fulcrum portions of the first lever and the second lever may be located between the respective grip and plate portions. In this case, the first lever is preferably provided in two separate parts divided by a median plane along the both sides, which then is assembled and integrally connected after pivotally sandwiching, between the bilateral half bodies of its fulcrum portion, the fulcrum portion of the second lever. It is further more preferable that the present hair styling iron is provided with a pilot lamp which blinks at predetermined intervals while the electric heater thereof is energized.

Furthermore, the fulcrum portions of the first and the second levers may be located at the rear end of the respective grip portions. In this case, it is preferable that a finger resting portion is provided on the outer side of each of the plate portions, with an intervening space for heat insulation being positioned therebetween.

The finger resting portion is preferably made up of a board-like or bar-like element that is continuous at its forward region to the surface of the plate portion, and at its rearward region to the grip portion.

In the hair styling iron of the present invention, the plate portions can be closed toward each other by causing a pivotal motion of the first and the second levers relative to each other around the fulcrum portions by gripping the grip portions of the first and second levers. The temperature of the plate portions can be elevated by energizing the heaters. Therefore, it is possible, by taking a strand of hair in one hand and then sandwiching it between the plate portions of the hair styling iron held in the other hand, to apply to the hair an elevated temperature as well as an evenly distributed pressure. In addition, by gently stroking the hair with the hair styling iron in this situation, a strainer operation can be performed.

Thus, as the hair styling iron of the present invention enables a strainer operation with simultanoues heating, it allows an effective strainer operation even with a perming solution at lower concentrations. Therefore, this is more friendly to the hair than the aforementioned operation where a strong stroke is applied with a comb and a panel. Thus it damaging hair. Moreover, it provides a more reliable strainer operation than the operation by means of a comb only.

The hair styling iron which is provided with a spring to render the plate portions biased in a direction away from each other, opening and closing of the plate portions can be effected simply by controlling the amount of the gripping force applied on the grip portions. It is thus also easy to control the pressure levels. In the hair styling iron provided with ridges formed along the perimeter of the plate portion, the temperature of the ridges, as cooled by surrounding air, remains lower than that of the other part of the plate portion even while the temperature of the latter is elevated. Therefore, an inadvertent contact with the skin would not cause excessive sensation of heat. Further, the hair styling iron which has been subjected to a flocking treatment from the perimeter to the outer surface of its plate portion, due to its lowered thermal conduction, will not cause an excessive sensation of heat when a limited contact with the skin occurs.

In the hair styling iron in which each of the fulcrum portions of the first and the second levers is located between the corresponding grip and plate portions, opening and closing of the plate portions is effected in the same manner as in handling pliers, i.e., by gripping the grip portion of the first lever with, for example, the thumb and the index finger and holding the grip portion of the second lever between, for example, the ring finger and the little finger. This type of hair styling iron is able to generate strong pressures between the plate portions because a sufficiently long distance may be adopted between the grip and the fulcrum portions.

In the hair styling iron in which the first lever is provided in two separate parts divided by a median plane along the both sides, which parts then is assembled and integrally connected after pivotally sandwiching the fulcrum portion of the second lever between the bilateral halves of its fulcrum portion, it is allowed for the second lever to be securely held by the first lever. In the type which is provided with a pilot lamp which blinks at predetermined intervals while the electric heaters are energized, it is allowed for the operator to conveniently follow the time lapse in each treatment by simply counting the blinks while performing thermal press treatment on the sandwiched portion of the hair.

With the hair styling iron in which each of the fulcrum portions is located at the rear end of the corresponding grip portion, it is possible to widely open and close the plate portions by slightly opening and closing the grip portions. In addition, as each of the fulcrum portions is located at the rear end, a compact configuration is possible. In this type of hair styling iron, moreover, when a finger resting portion is provided on the outer side of each of the plate portions, with an intervening space for heat insulation being positioned therebetween, less heat is conducted from the plate portion to the finger resting portion, thereby allowing to firmly close the plate portions using fingers without being disturbed by heat. Also, this configuration enables an easy operation even on a confined region of short hair, such as over the nape or around the ears, for it allows handling with fingers applied in close proximity to the plate portions, i.e. the portions between which a strand of hair is actually sandwiched.

Where the finger resting portion is made up of a board-like or bar-like element that is continuous, at its forward region, to the surface of the plate portion and, at its rearward region to the grip portion, it is allowed to readily mold the finger resting portion, plate portion and grip portion as a unitary part. In addition, as the finger resting portion is supported at its both ends, high flexural rigidity is provided. Furthermore, the wide surface area of the finger resting portion provides efficient cooling.

Embodiments of the hair styling iron of the present invention are described in greater detail below with reference to the drawings.

BRIEF DESCRIPTION OF THE DRAWINGS

FIG. 11b illustrates a sectional view taken along the line XIb—XIb in FIG. 8a.

DETAILED DESCRIPTION OF THE INVENTION

Figure 1:
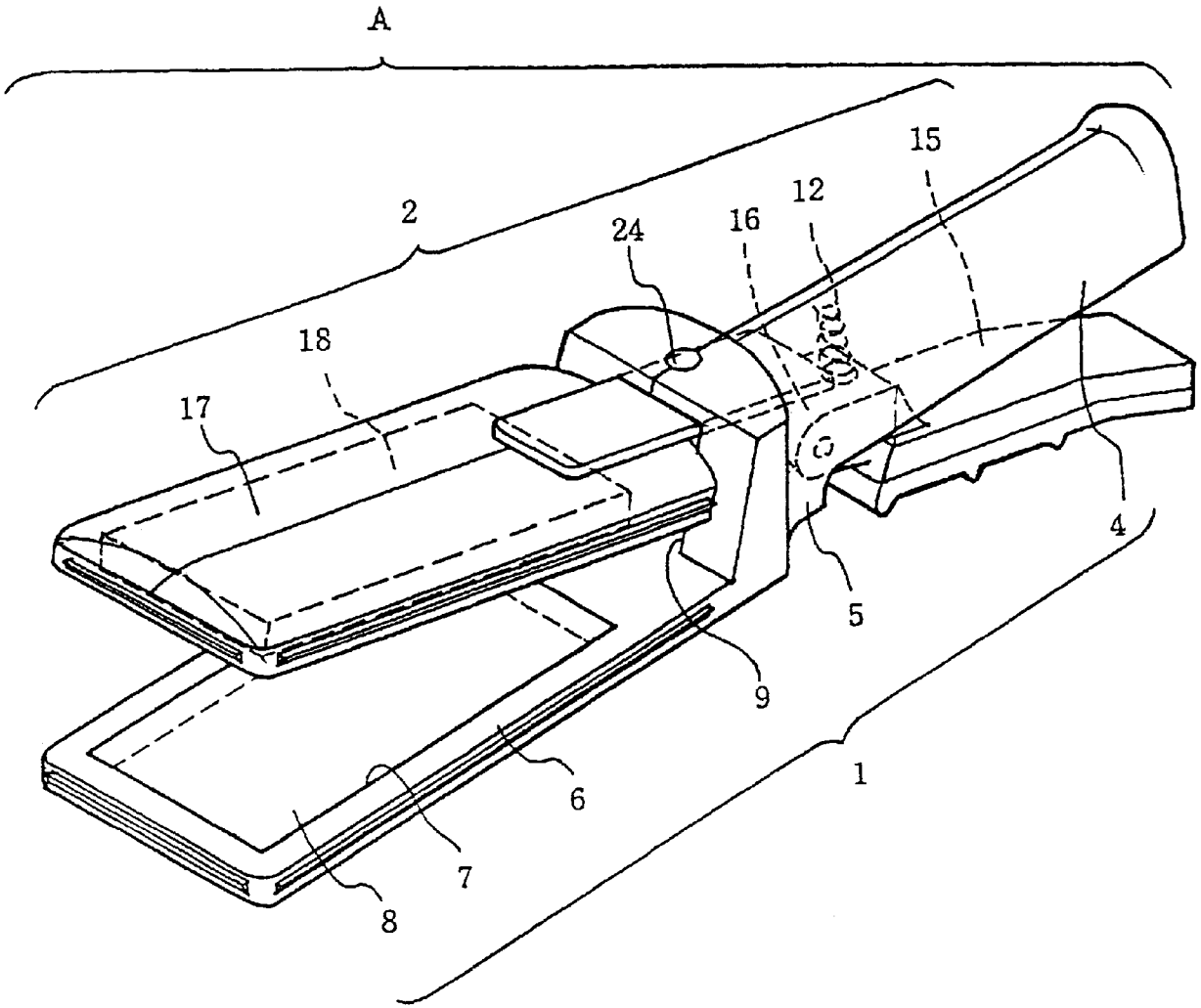
FIG. 1 illustrates a perspective view of an embodiment of the hair styling iron of the present invention.
Figure 2:
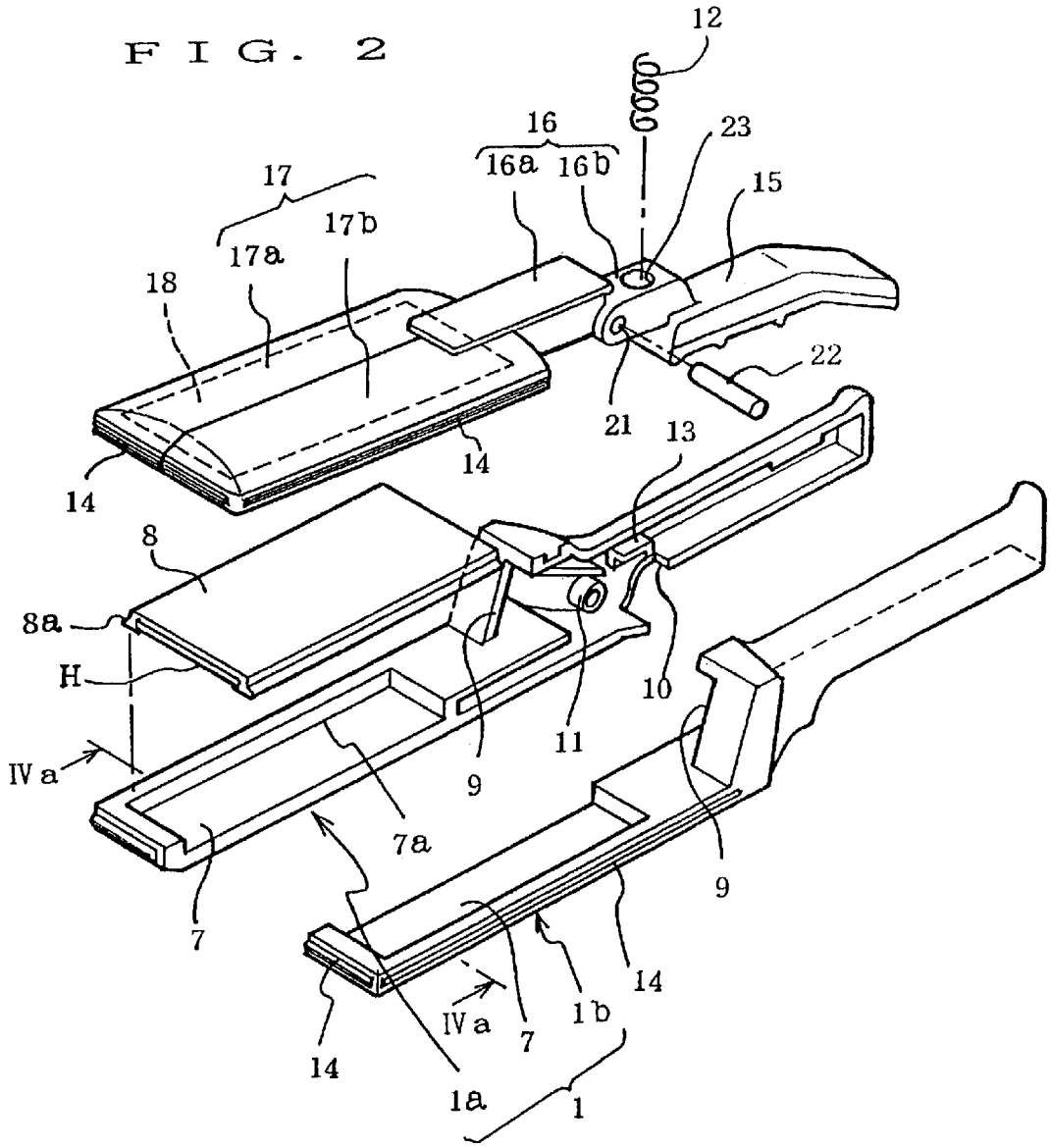
FIG. 2 illustrates an exploded perspective view of the embodiment illustrated in FIG. 1 before assembled.

The hair styling iron A illustrated in FIG. 1 consists of a body 1, which is also referred to as a first lever, and a sandwiching member 2, which is also referred to as a second lever, pivotally connected to the body 1. The body 1 includes a grip portion 4, a fulcrum portion 5 which extends downwardly from the forward end of the grip portion 4, and a plate portion 6 which extends forwardly from the lower end of the fulcrum portion 5. In this embodiment, the body 1 is molded as a pair of laterally separated half bodies 1a and 1b, as illustrated in FIG. 2. These half bodies then are matched with each other and connected to form the integral body 1. Plate portion 6 of the body 1 is formed with a rectangular recess 7, within which is nested a plate 8 including a plain heater H, with the surface of the plate 8 being exposed. Side walls of the recess 7 are formed with grooves 7a, which are brought into engagement with ridges 8a on both sides of the plate 8, thereby preventing the plate 8 from dislocation. Both the fulcrum portion 5 and the grip portion 4 are of hollow structure, and through the cavity thus defined extends an electric cord (see FIG. 5a, reference numeral 25) for energizing the heater H, via an on-off switch (FIG. 5a, symbol S), and out of the rear end of the grip portion 4.

Figure 5A:
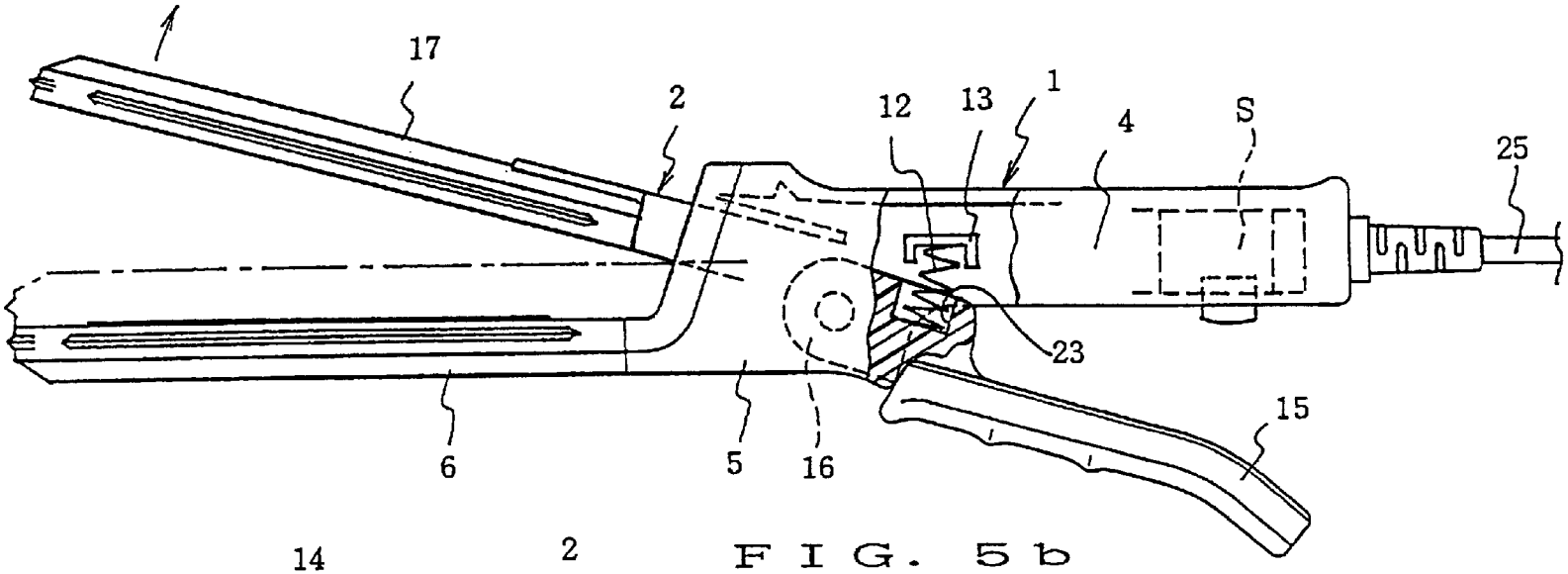
FIGS. 5a and 5b illustrate a partially cross-sectional side view and a plan view, respectively, of the hair styling iron.

In addition, rectangular openings 9 and 10 are defined in the front face of the fulcrum portion 5 and in the region from the rear end of the fulcrum portion 5 to the lower portion of the forward end of the grip portion 4, respectively, to pass the sandwiching member 2 through them. On the inner walls of the fulcrum portion 5, a protruding cylindrical bearing portion 11 is formed for providing pivotal support to the sandwiching member 2, as well as a spring receptacle 13 for receiving the upper end of a spring 12 is also defined. The spring 12 serves to pivotally bias the sandwiching member 2 so that, as illustrated in FIG. 5a, the forward end thereof is normally placed in open position. Around the perimeter of the plate portion 6 are formed ridges 14 of a semicircular cross-section. The body 1 may be, for example, a molded article of a heat-resistant plastic. Also, as desired, it may be produced through die casting of metals such as aluminum or zinc.

On the other hand, the sandwiching member 2 includes a lever portion 15, a fulcrum portion 16 which extends forwardly from the upper portion of the forward end of the lever portion 15, and a plate portion 17 which extends forwardly from the forward end of the fulcrum portion 16. The lever portion 15, when assembled as illustrated in FIG. 1, is located beneath the grip portion 4 of the body 1. In the sandwiching member 2 of this embodiment, plate portion 17 is provided in the form of two bilaterally divided parts. One of the half bodies, 17a, of plate portion 17, is molded integral to the forward end of the fulcrum portion 16. The other half body 17b is matched with and connected to the first half body 17a after nesting the separately prepared heater H and the plate 18. Also with the plate portion 17 of the sandwiching member 2, ridges 14 are formed around its perimeter. The plate portion 17 is formed with a recess 19 for nesting the plate 18, and side walls of the recess 19 are formed with grooves 20 to be brought into engagement with the ridges 18a of the plate 18 (see FIG. 4b).

Figure 4A:
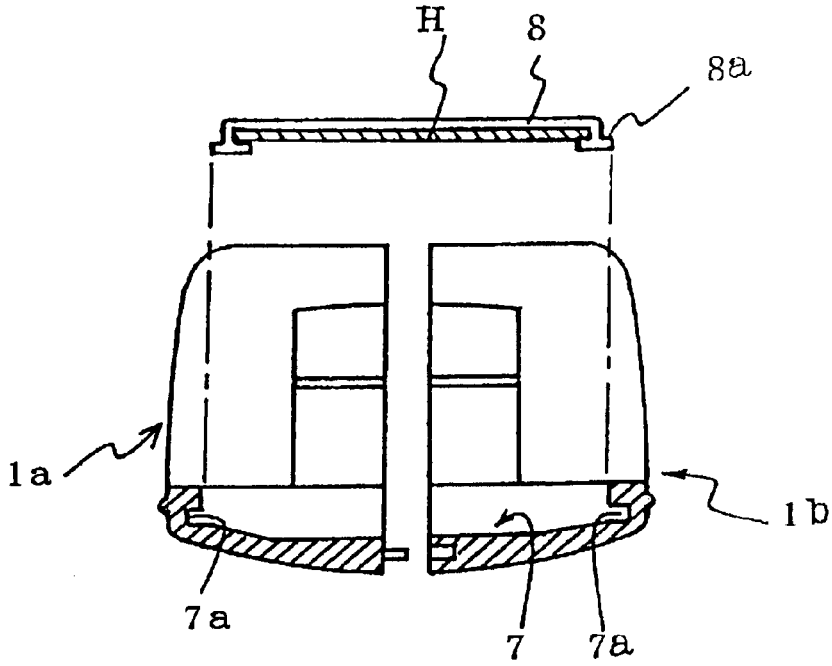
FIG. 4a illustrates a sectional view taken along the line IV–IV in FIG. 2.
Figure 4B:
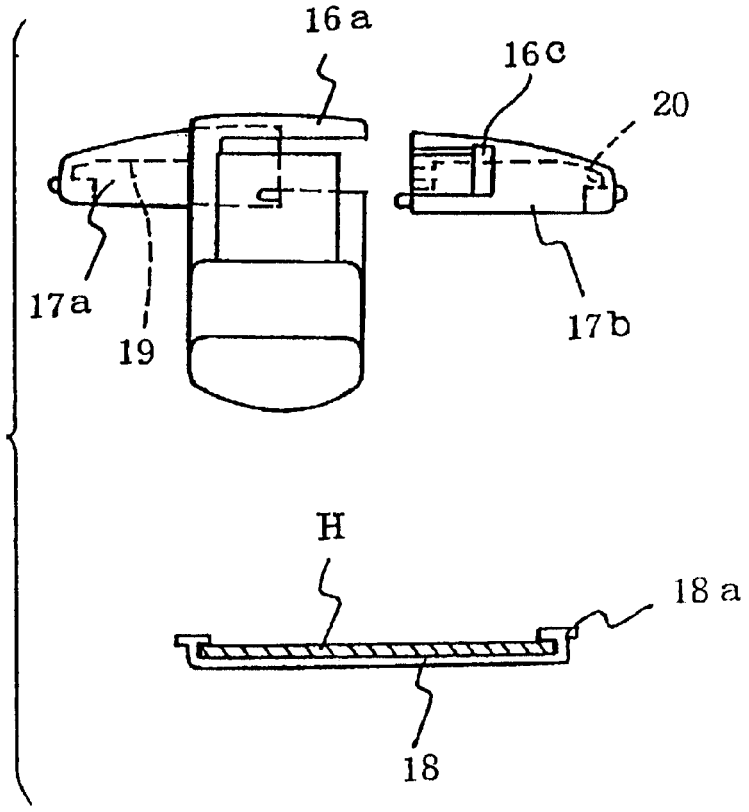
FIG. 4b illustrates a rear view of the sandwiching member viewed in the direction indicated by the arrow head b in FIG. 3.

The fulcrum portion 16 is of a shape such that the rearward part 16b thereof has undergone a downward translational shift relative to the forward part 16a. As illustrated in FIG. 4b, the forward part 16a is of a bracket-like shape, which is brought into engagement with and then connected, e.g. with bolts, to a support piece 16c extending from the rearward portion of the other half body 17b. The rearward part 16b of the fulcrum portion 16 is formed with a horizontal bore 21. The bore 21 is for accommodation of a pivot pin 22 which serves to pivotally connect the sandwiching member 2 to the body 1. A vertical blind bore 23 is also defined to rearward of the bore 21. The bore 23 is aimed for receiving and holding the lower end of the spring 12.

The lever portion 15 of the sandwiching member 2 is angled in its middle, with the rearward part extending obliquely downwardly. This allows secure engagement with the ring finger and the little finger. As is the case of the body 1, also the sandwiching member 2 may be, for example, a molded article of a heat-resistant plastic. As desired, it may also be produced through die casting of metals such as aluminum or zinc.

The plate portions 6 and 17 of the body 1 and the sandwiching member 2, respectively, have been subjected to an electrostatic flocking treatment from the perimeter to the outer surface thereof so as to lessen the sensation of heat when they come into contact with the skin. Flocking treatment may be carried out by embedding nylon pile fibers vertically in the surface layer of the plate portions which has been dissolved with naphtha. In addition, the surface of the plates 8 and 18 has been subjected to a treatment that serves to reduce friction, e.g. Teflon coating, thereby allowing easy slide of the hair therebetween. Teflon coating further improves non-tackiness, heat resistance and erosion resistance.

Figure 3:
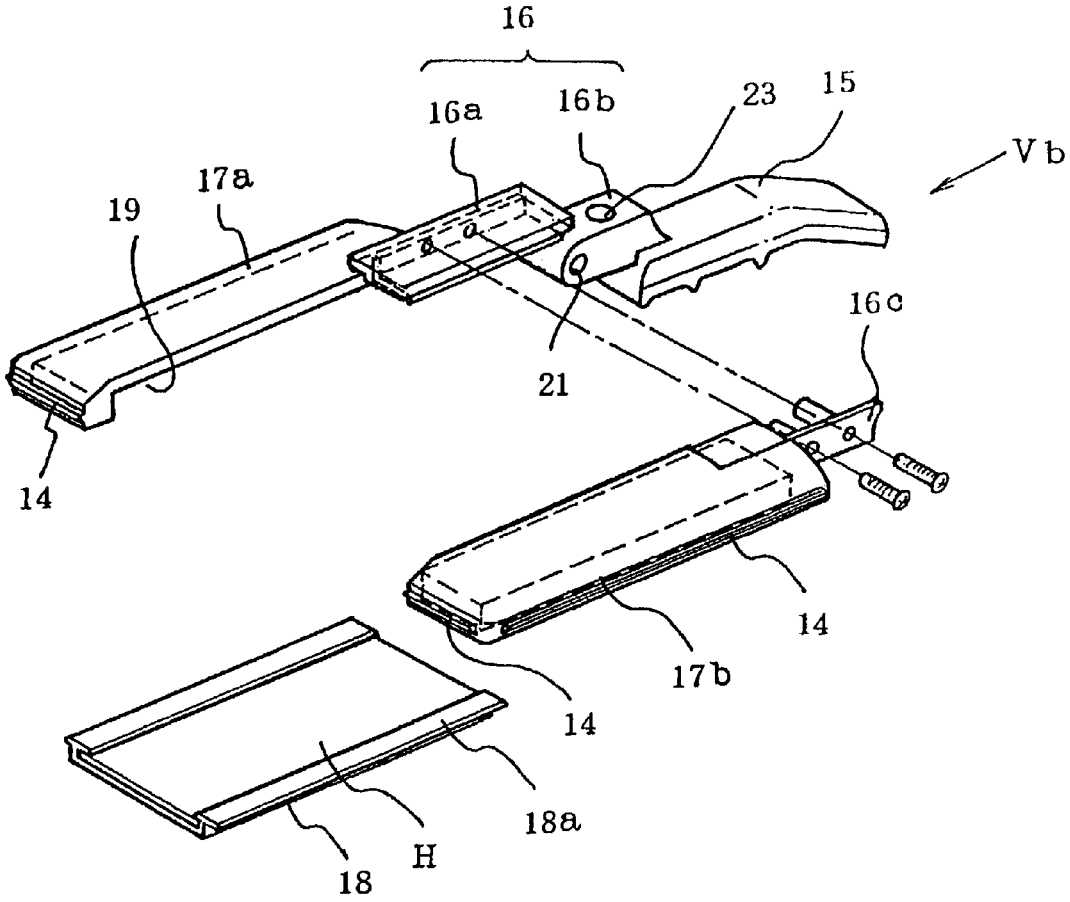
FIG. 3 is an perspective view of the sandwiching member illustrated in FIG. 2 before assembled.

The body 1 and the sandwiching member 2 thus provided are assembled as follows: First, the sandwiching member 2 is assembled by nesting the heater 18 within the half body 17a of the plate portion 17 of the sandwiching member 2, and then matching and securing therewith the other half body 17b (see FIG. 3). Preferably, one of the half bodies is provided with pin-like projections, which are mated with corresponding bores formed in the other half body, in order to assist positioning and reinforce connection (see FIGS. 4a and 4b). As desired, an adhesive may be applied. Then, the pivot pin 22 is inserted in the bore 21 of the fulcrum portion 16 of the sandwiching member 2. The heater 8 is then nested within the plate portion 6 of the half body 1a of the body 1, the spring 12 is inserted into the bore 23, and then the end of the pivot pin 22 are mated with the bearing portions 11 of the fulcrum portion 5 of the body 1. Finally, the other half body 1b of body 1 is integrally connected, with the fulcrum portion 16 passing through the openings 9 and 10. Thus, the hair styling iron as illustrated in FIGS. 1, 5a and 5b is obtained.

Figure 5B:
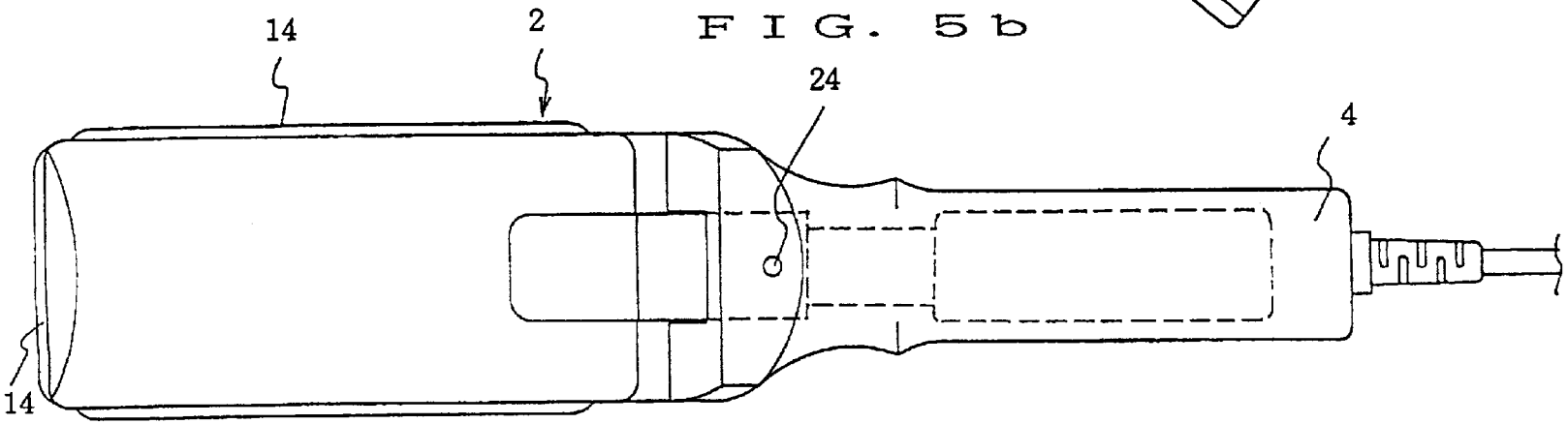

The reference numeral 24 in FIGS. 1 and 5b indicates a pilot lamp or indicator lamp which tells when the heater H is energized. The pilot lamp 24 comprises a light-emitting diode. The pilot lamp 24 operates in either of the two modes, i.e., a mode in which it is kept ON while the heater H is energized and an ON-OFF mode in which it is turned on (or off) at predetermined intervals, e.g. once in every second, and it can be switched between these modes. Where the latter mode is selected, the operator can readily follow the time lapse while a strand of hair is being press-treated. The reference numeral 25 in FIG. 5a indicates an electric cord, the end of which is connected with a plug, and in the middle of which is provided with a controller including a temperature adjustment dial. A temperature sensor is provided on or in close proximity to the heater H. The system is arranged so that the heater H is kept at a temperature selected with the temperature adjustment dial through the regulation of the current (or voltage) applied to the heater H based on the output from the sensor and by means of the controller including the temperature adjustment dial and a controller circuit. The temperature adjustment dial is, for example, a volume dial that allows to select a desired temperature within the range of 60–180° C. For a temperature frequently selected, the dial is provided with a detent mechanism which temporarily locks the dial with a snapping sensation so as to prevent the dial from drifting. A blink control circuit for the aforementioned pilot lamp 24 is also included in the controller.

Figure 6:
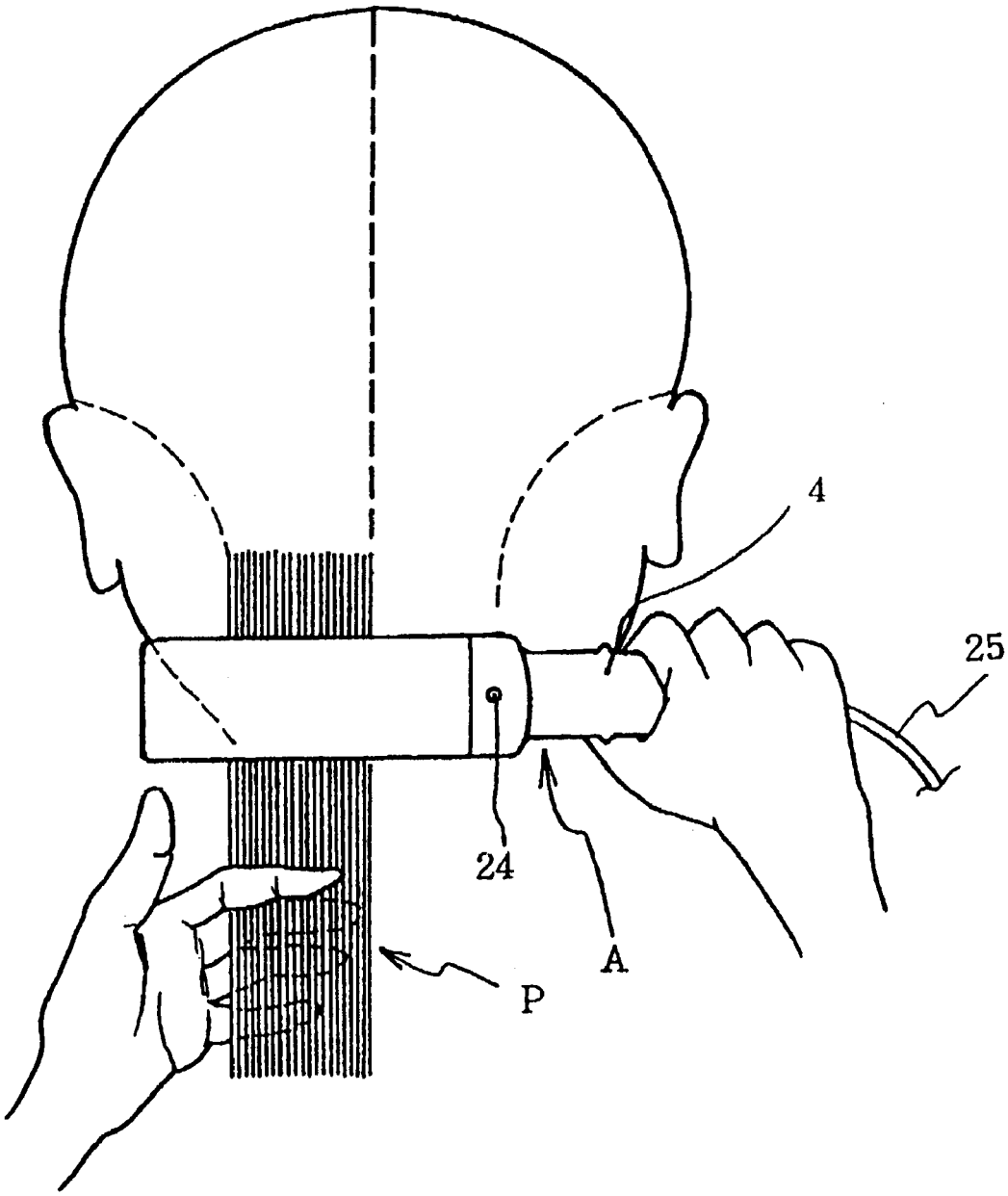
FIG. 6 illustrates the hair styling iron being used.

The thus assembled hair styling iron A is used as exemplified in FIG. 6. That is, the hair styling iron A is held, with, for example, the thumb and the index finger, with the grip portion 4 of the body 1 facing upward, a strand of hair P sliced with the left hand is placed between the plate portions, and then pressure is applied by pulling the lever with, for example, the ring and the small fingers. In this manner, a press-treatment is performed in which the hair is subjected to a pressure while being simultaneously heated at an appropriate temperature. The time lapse during the press treatment, e.g. a span of several seconds, can readily be followed based on the blinking of the pilot lamp 24. In addition, a strainer operation can be carried out by sliding the plate portions toward the tip of the hair, with the strand of hair B being lightly sandwiched therebetween. For this purpose, a slice of 1–3 cm wide is proper. While sliding the hair styling iron A, tension is preferably applied to the strand of hair P by lightly pulling it downwardly with the left hand.

With the above hair styling iron A, as heat and pressure can be applied to the hair sandwiched between the plate portions 6 and 17 of the body 1 and the sandwiching member 2, a partially curled area of the hair could be corrected with ease. In addition, as a heater is included in each of the plate portions 6 and 17 of the body 1 and the sandwiching member 2, a simultaneous and uniform heating is effected on both sides of the sandwiched strand of hair P. Furthermore, as the plate portions 6 and 17 of the body 1 and the sandwiching member 2 are biased to open by means of the spring 12, easy control of pressure is available. Still further, each of the plate portions 6 and 17 of the hair styling iron A has been subjected to an electrostatic flocking treatment on its outer surface (i. e. the surface opposite to the side nesting the heater H and the plate 8 or 18) and perimeter, and the ridges 14 are provided on each of the perimeters of the plate portions 6 and 17. Thus, an inadvertent touch on the skin with the outer surface or perimeter of the plate portions 6 or 17 would not cause excessive sensation of heat.

A description is given below to a procedure of carrying out a straight perm operation using the hair styling iron A:

To begin with, a first solution for straight-perming is applied to the hair, and the hair is allowed to stand for a while so as to assure the first solution sufficiently soaking into the hair, thus reducing and softening the hair with the solution. Then after conducting a softening test to confirm that a desired level of softening is reached, the hair is subjected to an intermediate washing with water to wash away the agent adsorbed on the hair. Then, after removing excess water from the hair, the aforementioned strainer treatment is started (2–3 strainer operations for a single slice of hair). A second solution is then applied to the hair, and the hair is allowed to stand, while keeping it extended straight, for effecting oxidation and thereby restoration of elasticity of the hair with the second solution to complete straight-perming.

In this straight-perming treatment, a strainer operation is performed primarily for evenly rearranging cuticle to the tip of the hair, thereby giving the hair a glossy smooth surface.

While in the above embodiment, the sandwiching member 2 is passed through the openings 9 and 10 formed in the body 1, a configuration is also allowed in which a sandwiching member and a body are simply crossed against each other and connected with a pivot pin, as in the manner known for usual scissors.

Figure 7:
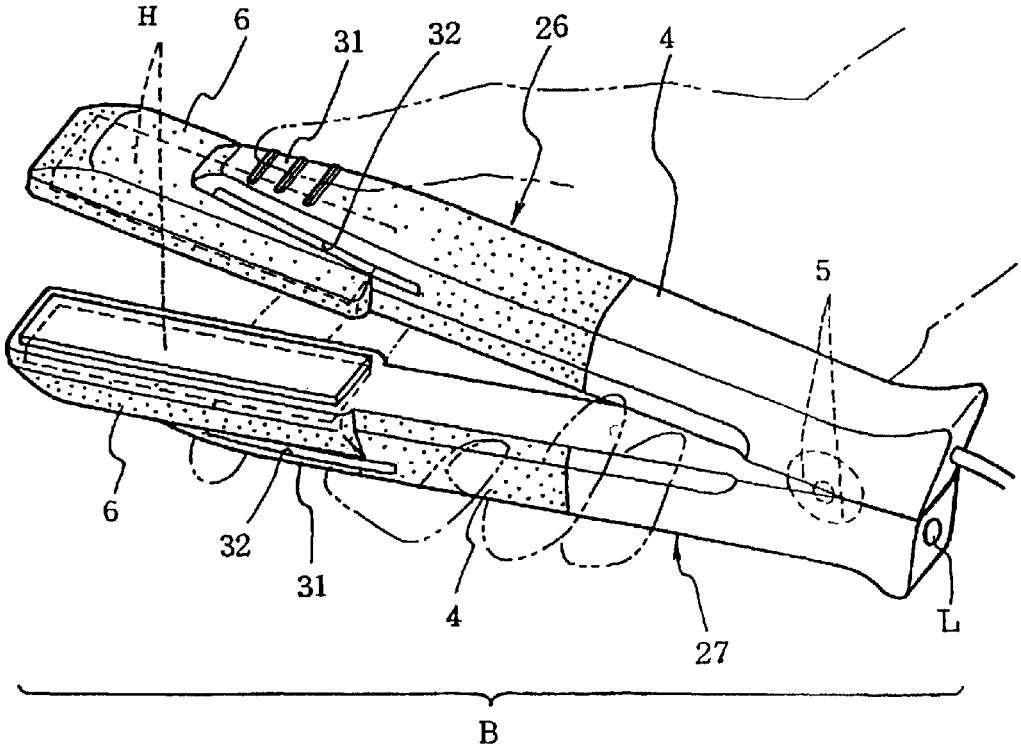
FIG. 7 illustrates a perspective view of another embodiment of the hair styling iron of the present invention.
Figure 8A:
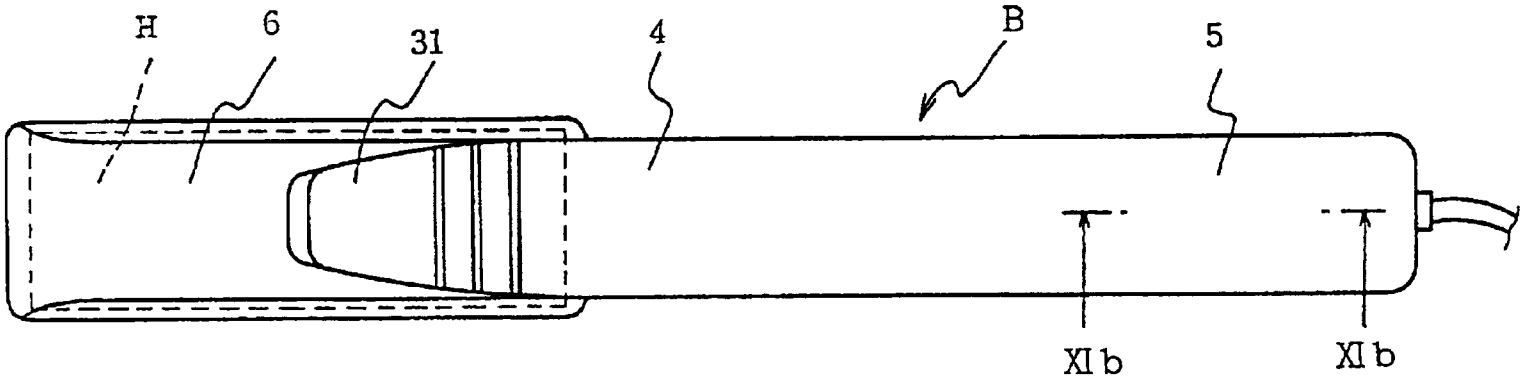
FIGS. 8a and 8b illustrate a plan view and a side view of the hair styling iron illustrated in FIG. 7.
Figure 8B:
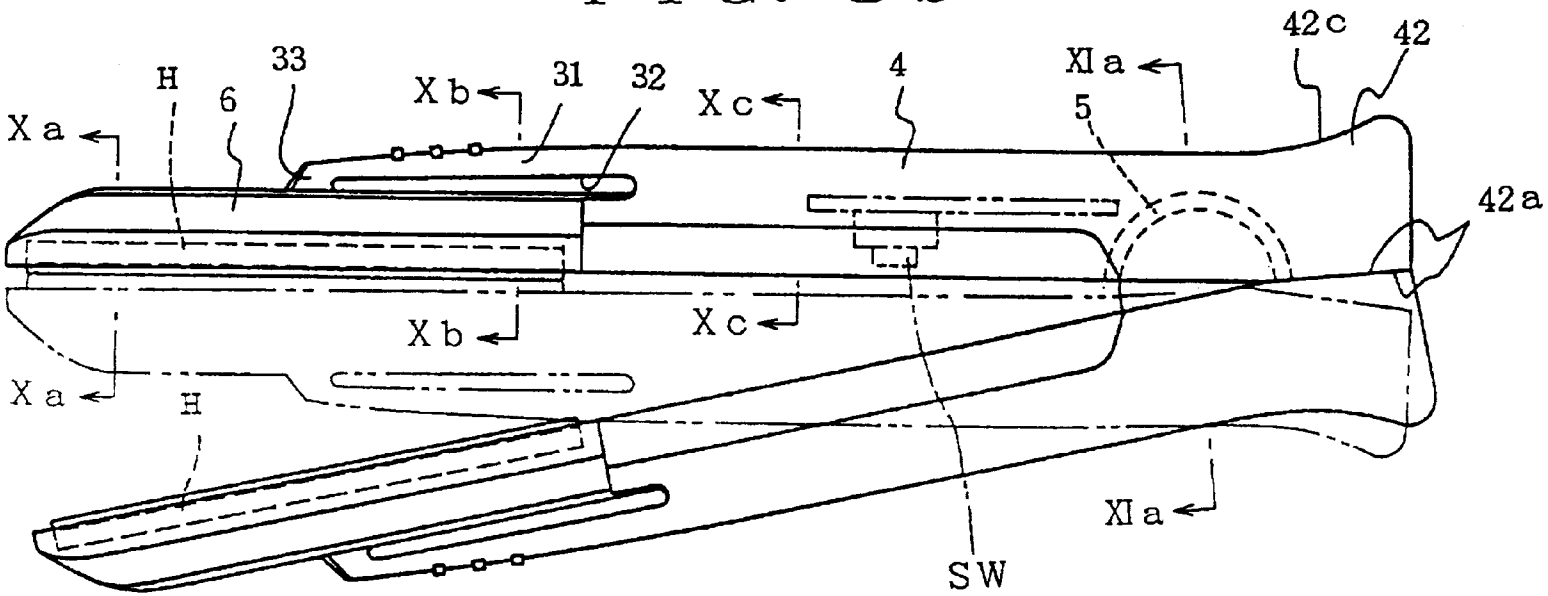

A hair styling iron B illustrated in FIGS. 7 and 8 includes a first lever 26 and a second lever 27, the latter being pivotally connected at its rear portion with the rear portion of the former. The first lever 26 includes a grip portion 4 located in the middle of its length, a fulcrum portion 5 located in the rear, and a plate portion 6 located in the forward portion. In this embodiment, the second lever 27 is of the same configuration as the first lever. Therefore, the following description is given primarily with regard to the first lever 26. Herein, symbol H indicates a heater, SW in FIG. 8b a switch for on-off of the power supply to the heater H, and reference numeral 24 a pilot lamp for indicating on-off of the heater H.

Figure 9:
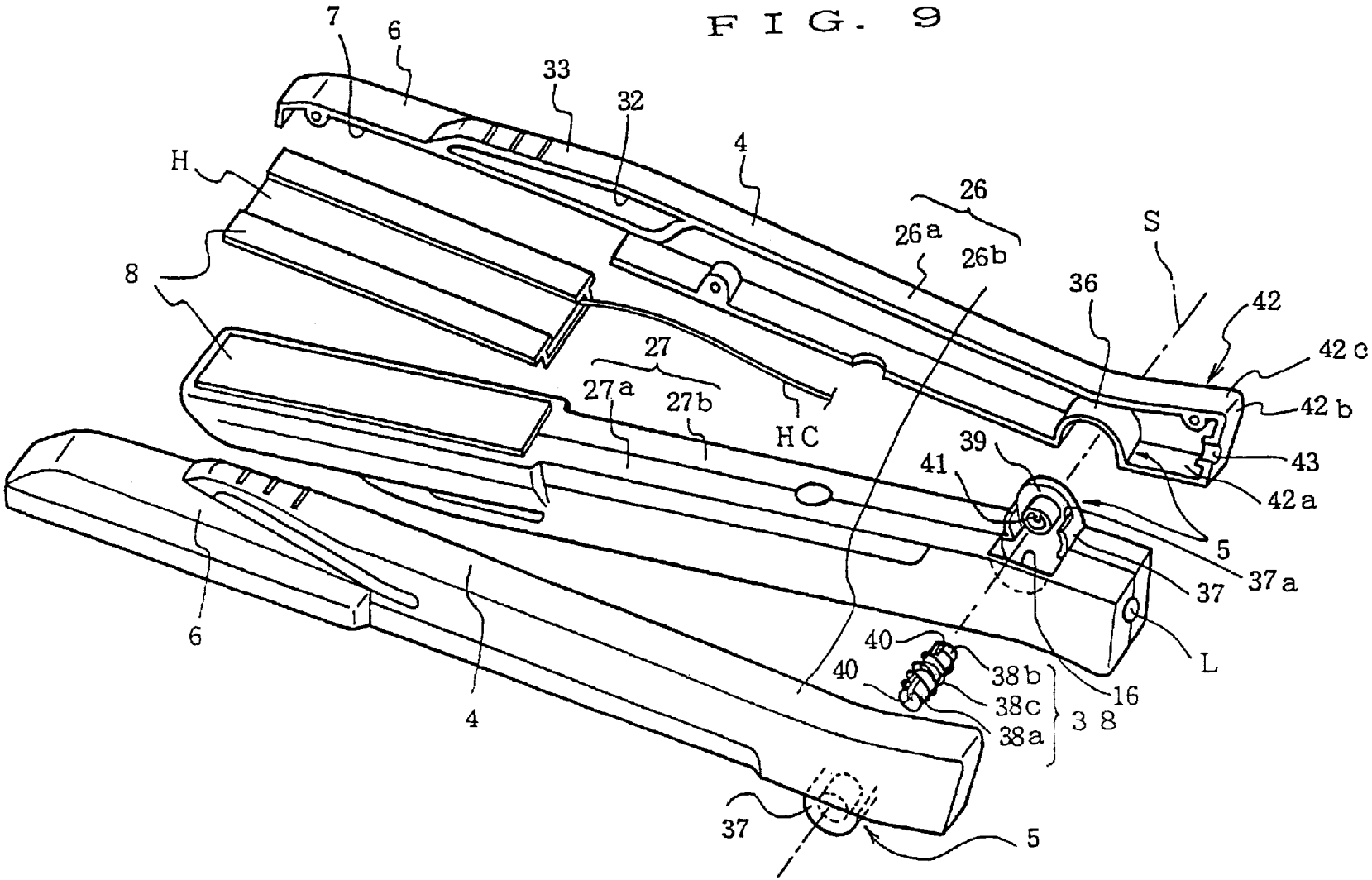
FIG. 9 illustrates an exploded perspective view of the hair styling iron illustrated in FIG. 7 before assembled.

As illustrated in FIG. 9, also in this embodiment, the body of the first lever 26 is molded as two laterally divided hollow half bodies 26a and 26b of a heat-resistant plastic or the like, which are then matched and connected with each other to form a single integral hollow body as shown with regard to the second lever 27. In this embodiment, the right half body 26a of the first lever 26 and the left half body 27a of the second lever 27 are of the same shape, and so are the left half body 26b of the first lever 26 and the right half body 27b of the second lever 27.

Figure 10A:
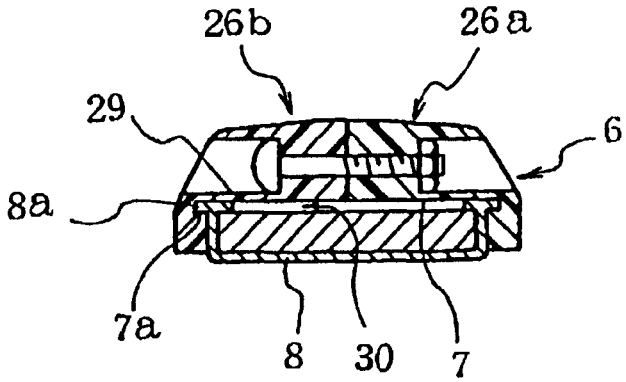
FIG. 10a illustrates a sectional view taken along the line Xa—Xa in FIG. 8b.
Figure 10B:
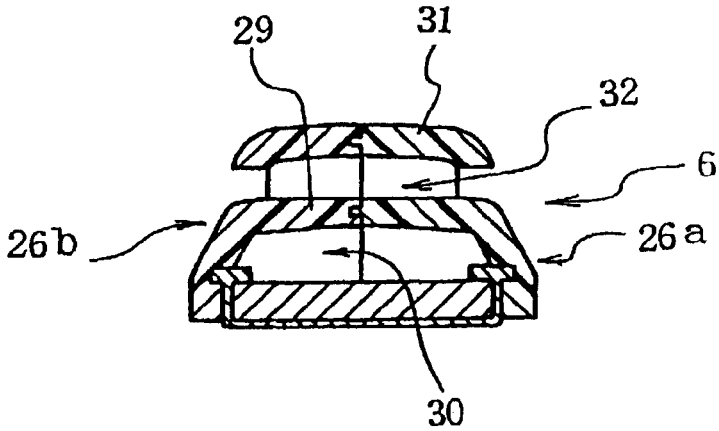
FIG. 10b illustrates a sectional view taken along the line IXb—IXb in FIG. 7b.

The plate portion 6, as in the hair styling iron A aforementioned, has flat and generally rectangular configuration, the inner side (the side opposed to the second lever 27) of which is formed with a rectangular recess 7, within which a plate 8 containing a plain heater H is nested, with its outer surface being exposed. The plate 8 is made of a thin metal sheet. As illustrated in FIGS. 10a and 10b, side walls of the recess 7 are formed with grooves 7a, which are brought into engagement with the ridges 8a on both sides of the plate 8, thereby preventing the plate 8 from dislocation. A space 30 is defined between the upper face of the heater H and the upper wall 29 of the plate portion 6. Therefore, the heater H and the plate 8 are in contact with the first lever 26 only through their lateral perimeters. This hinders conduction of heat to the first lever 26.

The grip portion 4 is narrower in width than and somewhat elevated compared with the plate portion 6. As FIG. 8b clearly illustrates, a board-like finger resting portion 31 extends from around the forward end of the grip portion 4 toward the middle of the plate portion 6. The upper face of the finger resting portion 31 is flush with the upper face of the grip portion 4, and a transverse through slit 32 is defined between the plate portion 6 and the finger resting portion 31 (see FIG. 10b). The slit 32 continues from around the forward end of the finger resting portion 31 to the middle of the grip portion 4. Thus, finger resting portion 31 is continuous to the plate portion 6 only at its forward end 33. The slit 32 is provided to hinder conduction of heat from the plate portion 6 to the finger resting portion 31. Alternatively, the finger resting portion 31 may be configured such that it is spaced away at its forward end 33 from the plate portion 6, thus forming the former as a cantilever. In addition, the slit 32 may be filled with foamed plastic with high heat insulation. The "space" recited in the attached claims is meant to include such an embodiment. Furthermore, the slit 32 may be laterally closed. In such a case, the space ("slit") within the finger resting portion 31 is provided as an isolate heat insulation space separated with a plate from the interior of the plate portion 6.

Figure 10C:
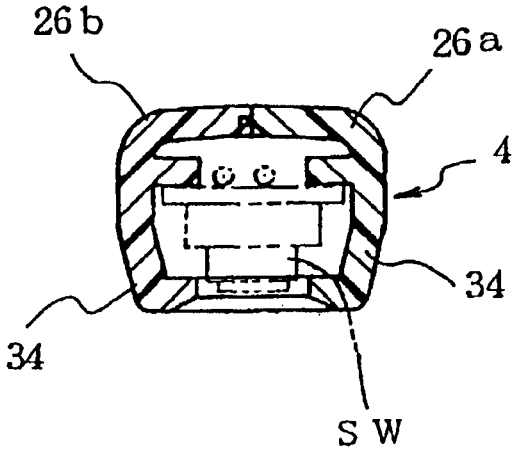
FIG. 10c illustrates a sectional view taken along the line IXc—IXc in FIG. 7b.

As FIG. 10c illustrates, the grip portion 4 also is of a hollow structure, and its both sides are formed with slanted surfaces 34 in its lower portion, with the width of the grip portion 4 decreasing downwardly. These slanted surfaces 34 provide escapes which help avoid pinching the palm of the hand holding the grip portion 4 while the first lever 26 and the second lever 27 are being closed toward each other. SW shown in phantom lines in FIG. 10c indicates the switch as aforementioned.

Figure 11A:
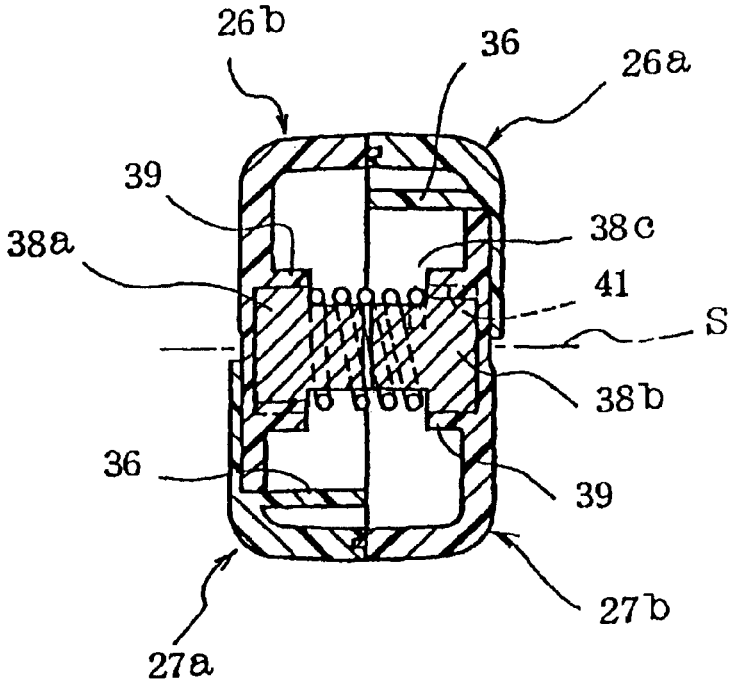
FIG. 11a illustrates a sectional view taken along the line XIa—XIa in FIG. 8b.
Figure 11B:
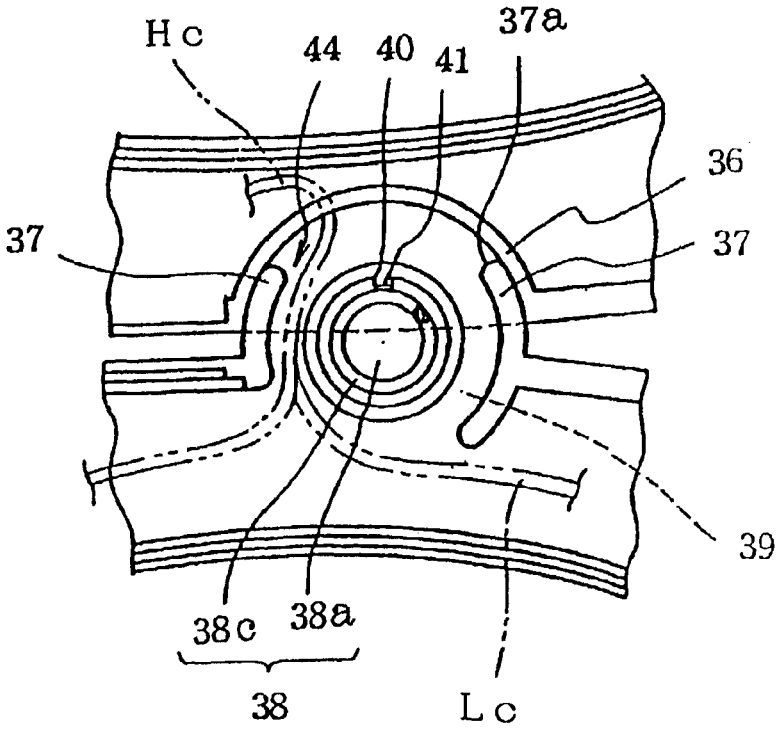

As illustrated in FIG. 9, the fulcrum portion 5 of the first lever 26 includes a generally hemicylindrical blind bearing portion 36 provided on the right half body 26a, and a generally hemicylindrical shaft portion 37 provided on the left half body 26b. The bearing portion 36 is given a central angle smaller than 180° (e.g. 173.5°) by half (e.g. 6.5°) of the maximal opening angle (e.g. 13°) between the levers. Since it is enough for the shaft portion 37 to be allowed a pivotal motion within the bearing portion 36 up to a predetermined angle (see FIG. 11b), as can be seen in the right half body 27b of the second lever 27, the shaft portion 37 is composed only of an opposing pair of arc-like elements, with its upper wall being cut out by a predetermined angl. This cutout 37a is utilized to pass through a heater cord Hc and a pilot lamp cord Lc, as illustrated in FIG. 11b. On the base plate of the shaft portion 37 is formed a protruding cylindrical boss 39 in which a spring shaft 38 is to be fit (see FIGS. 11a and 11b). The spring shaft 38 is composed of a pair of shaft members 38a and 38b which are concentrically aligned via a gap therebetween and a torsion coil spring 38c which is arranged around the shaft members and secured at its both ends to the shaft members 38a and 38b. On the surface of each of the shaft members 38a and 38b is defined a locking groove 40 extending parallel to the axis, and on the inner surface of each of the bosses 39 is formed a locking ridge 41 for engagement with the locking groove 40 (see FIG. 11b).

The inner wall 42a of the rear portion 42 located to rearward of the fulcrum portion 5 of the first lever 26, i.e. the wall opposed to the second lever, is angled relative to the grip portion 4 by half of the aforementioned maximal opening angle. Therefore, inner walls 42a of the rear portions 42 provide a stopper. In the rear end wall 42b is defined an opening 23 for an electric cord. The upper wall 42c of the rear portion 42 is angled upwardly toward the rear end. This angle serves as an anti-slip configuration to prevent the hair styling iron held by the operator from slipping off.

As illustrated in FIG. 7, also in this embodiment, the first lever 26 and the second lever 27 have been subjected to an electrostatic flocking treatment on the plate portions 6, the finger resting portions 31 and the forward part of the grip portions 4.

An example of assembling procedure of the hair styling iron B is described below:

First, one of the shaft members 38a of the spring shaft 38 is fit in the boss 39 of the left half body 26b of the first lever 26, with the locking ridge 41 being engaged with the locking groove 40. Then, the right half body 27b of the second lever 27 is pivoted by 180° about the pivot axis S with respect to the left half body 26b of the first lever 26. In this orientation, the other shaft member 38b of the spring shaft 38 is fit in the boss 39, with the locking ridge 41 being engaged with the locking groove 40. Then, against the biasing force of the torsion coil spring 38c, the right half body 27b of the second lever 27 is pivoted back by 180° for allowing it to meet the half body 26b of the first lever 26. Then, the remaining half bodies 26a and 27a are mated with corresponding half bodies 26b and 27b, respectively. In this process, positioning is made by placing each bearing portion 36 over the corresponding shaft portion 37. Thus, the first lever 26 and the second lever 27, respectively, are integrally assembled.

The heaters H and the plates 8 are inserted into the plate portion 6 of one of the half bodies either before the start of the assembling procedure or just prior to the assembling of the half bodies. The cord Hc of the heater H of the first lever 26 has been connected to the output terminals of the switch SW and the cord from the input terminals of the switch SW is directed out of an opening 43 defined in the rear. As illustrated in FIG. 11b, the cord Hc of the heater H of the second lever 27 extends through a gap 44 between the shaft portion 37 and the boss 39 and is then connected to the output terminals of the switch SW placed in the first lever 26. In the opening 43 in the rear of the second lever 27 is fit by the aforementioned indicator lamp 24, the cord Lc of which also extends through the gap 44 between the shaft portion 37 and the boss 39 and is then parallel connected to the output terminals of the switch SW. In the second lever 27, as no switch is contained in it, the opening for switch is closed with a closing member.

The lamp 24 and the method for controlling its on-off is the same as described with regard to the hair styling iron A.

In the hair styling iron B thus assembled, each of the first lever 26 and the second lever 27 is formed into an integral unit. As the shaft portion 37 of each of the half bodies 26b and 27b is in slidable contact with the inner surface of the bearing portion 36, the first and the second levers are pivotal relative to each other about the pivot axis S. Therefore, the plate portions 8 are brought into abutment against each other by pinching the both finger resting portions 31 together with the thumb and the index finger while holding the hair styling iron on the grip portions 4 (see phantom lines in FIG. 8b). With the switch SW put on beforehand, the temperature of the heaters H has been elevated. Thus, press treatment can be carried out, in which the hair is sandwiched and then pressed between the plates 8 while heating it at an appropriate temperature. As the plates 8 are biased away from each other by the biasing force that the torsion coil spring 38c generates, reduction of gripping force first causes reduction of the pressure and then results in the plate portions 8 going apart from each other. This motion ceases when the inner walls 42a of the rear portions 42 abut against each other.

Also with the hair styling iron B, a strainer operation can be carried out in the same matter as with the aforementioned hair styling iron A. In addition, as it is made compact, the hair styling iron B is easy to handle with one hand. Therefore, it allows a relatively easy press treatment even on a confined region of short hair such as over the nape or around the ears by placing the strand of hair sliced with, for example, the left hand between the plates 8, and appropriately adjusting the force applied to the finger resting portions 31 with the thumb and the index finger while holding the grip portions 4. In such a case, easy operation is allowed as heat conduction to the finger resting portions 31 is hindered by the slit 32 defined between the finger resting portions 31 and the plate portions 6.

In this embodiment, as the first lever 26 and the second lever 27 are given the same shape, there is provided an advantage of lowering the costs of production and maintenance of the metal mold required. However, it is also allowed to adopt other configurations. In the previous embodiment, as the fulcrum portion 5 of the first lever 26 and that of the second lever are combined in nesting fashion, a neat outlook is provided, with the shaft ends or the like being concealed once assembled. However, it is also allowed that the fulcrum portions are simply crossed against each other and connected with a pivot pin, in the same manner as usual scissors. Moreover, it is also allowed that the spring shaft 38 is eliminated and the plate portions are opened with fingers.

What is claimed is:

1. A hair styling iron comprising:

a first lever including a first grip portion, a first plate portion equipped with an electric heater, and a first fulcrum portion, and a second lever including a second grip portion opposed to said first grip portion, a second plate portion equipped with an electric heater and opposed to said *first plate* portion of said first lever, and a second fulcrum portion pivotally supported by said first fulcrum portion of said first lever, wherein at least one of said first plate portion or said second plate portion has ridges along substantially a full length of three sides of the corresponding plate portion, wherein said first fulcrum portion and said second fulcrum *portion* are located between a respective grip and plate portion, and wherein said first lever is provided in two separate parts divided by a median plane, the two separate parts then are assembled and integrally connected after pivotally sandwiching said second fulcrum portion between bilateral halves of said first fulcrum portion of said first lever.

2. The hair styling iron of claim 1, wherein a spring is interposed between said first lever and said second lever, said spring biasing said first plate portion and said second plate portion in a direction away from each other.

3. The hair styling iron of claim 1, *further comprising* a pilot lamp, the pilot lamp having means to blink the lamp on and off at predetermined intervals while said electric heater is energized.

[4. The hair styling iron of claim 1, wherein said first fulcrum portion and said second fulcrum portion are located at a rear end of a respective grip portion, and a finger resting portion is provided on an outer side of each of said first plate portion and said second plate portion with an intervening space for heat insulation being positioned between each said finger resting portion and a corresponding plate portion.]

[5. The hair styling iron of claim 4, wherein said finger resting portion is a board-like or bar-like element that is continuous, at the forward region thereof, to the surface of said plate portion and, at the rearward region thereof, to said grip portion.]

[6. The styling iron of claim 1, wherein said first plate portion and said second plate portion have ridges.]

7. A hair styling iron comprising:

a first lever including a first grip portion, a first plate portion equipped with an electric heater, and a first fulcrum portion, and a second lever including a second grip portion opposed to said first grip portion, a second plate portion equipped with an electric heater and opposed to said *first plate* portion of said first lever, and a second fulcrum portion [pivotally supported by] *abutting against* said first fulcrum portion of said first lever *to permit the first lever and the second lever to rotate relative to each other*, wherein at least one of said first plate portion or said second plate portion has been subjected to a flocking treatment from a perimeter to an outside surface thereof, wherein a spring is interposed between said first lever and said second lever, said spring biasing said first plate portion and said second plate portion in a direction away from each other, and wherein said first fulcrum portion and said second fulcrum are located between a respective grip and plate portion.

8. The hair styling iron of claim 7, wherein said first lever is provided in two separate parts divided by a median plane, the two separate parts then being assembled and integrally connected after pivotally sandwiching said second fulcrum portion between the bilateral halves of said first fulcrum portion of said first lever.

9. The hair styling iron of claim 7, further comprising a pilot lamp, the pilot lamp having means to blink the lamp on and off at predetermined intervals while said electric heater is energized.

[10. The hair styling iron of claim 7, wherein said first fulcrum portion and said second fulcrum portion are located at a rear end of a respective grip portion, and a finger resting portion is provided on an outer side of each of said first plate portion and said second plate portion with an intervening space for heat insulation being positioned between each said finger resting portion and a corresponding plate portion.]

[11. The hair styling iron of claim 10, wherein said finger resting portion is a board-like or bar-like element that is continuous, at the forward region thereof, to the surface of said plate portion and, at the rearward region thereof, to said grip portion.]

12. The styling iron of claim 7, wherein said first plate portion and said second plate portion have been subjected to the flocking treatment.

*13. A hair styling iron comprising:*

*a first lever including a first grip portion, a first plate portion equipped with an electric heater, and a first fulcrum portion, and*

*a second lever including a second grip portion opposed to said first grip portion, a second plate portion equipped with an electric heater and opposed to said first plate portion of said first lever, and a second fulcrum portion pivotally supported by said first fulcrum portion of said first lever,*

*wherein said first fulcrum portion and said second fulcrum portion are located at a rear end of a respective grip portion,*

*wherein at least one of said first plate portion or said second plate portion has ridges along substantially a full length of three sides of the corresponding plate portion, and*

*a finger resting portion is provided on an outer side of each of said first grip portion and said second grip portion which extend over an intervening space for heat insulation positioned between each said finger resting portion and a corresponding plate portion.*

*14. The hair styling iron of claim 13, wherein said finger resting portion is a board-like or bar-like element that is continuous, at the forward region thereof, to the surface of said plate portion and, at the rearward region thereof, to said grip portion.*

*15. The styling iron of claim 13, wherein said first plate portion and said second plate portion have ridges.*

*16. A hair styling iron comprising:*

*a first lever including a first grip portion, a first plate portion equipped with an electric heater, and a first fulcrum portion, and*

*a second lever including a second grip portion opposed to said first grip portion, a second plate portion equipped with an electric heater and opposed to said first plate portion of said first lever, and a second fulcrum portion pivotally supported by said first fulcrum portion of said first lever,*

*wherein at least one of said first plate portion or said second plate portion has been subjected to a flocking treatment from a perimeter to an outside surface thereof,*

*wherein said first fulcrum portion and said second fulcrum portion are located at a rear end of a respective grip portion, and a finger resting portion is provided on an outer side of each of said first grip portion and said second grip portion which extend over an intervening space for heat insulation positioned between each said finger resting portion and a corresponding plate portion.*

*17. A hair styling iron of claim 16, wherein said first plate portion and said second plate portion have ridges.*

*18. The hair styling iron of claim 17, wherein said finger resting portion is a board-like or bar-like element that is continuous, at the forward region thereof, to the surface of said plate portion and, at the rearward region thereof, to said grip portion.*

* * * * *